(12) United States Patent
Barra et al.

(10) Patent No.: US 8,056,633 B2
(45) Date of Patent: Nov. 15, 2011

(54) APPARATUS AND METHOD FOR REMOVING SUBSEA STRUCTURES

(76) Inventors: Marc T. Barra, Arnaudville, LA (US);
James L. Parker, III, Katy, TX (US);
Adam C. Alborado, Katy, TX (US);
Robert M. Champagne, III, Theriot, LA (US)

( * ) Notice: Subject to any disclaimer, the term of this patent is extended or adjusted under 35 U.S.C. 154(b) by 576 days.

(21) Appl. No.: 12/110,576

(22) Filed: Apr. 28, 2008

(65) Prior Publication Data
US 2009/0266552 A1 Oct. 29, 2009

(51) Int. Cl.
*E21B 29/00* (2006.01)
(52) U.S. Cl. .......... 166/298; 166/339; 166/361; 166/55; 166/55.6; 405/156
(58) Field of Classification Search ................ 166/298, 166/339, 340, 351, 361, 297, 55, 55.1, 55.6; 405/156; 83/54
See application file for complete search history.

(56) References Cited

U.S. PATENT DOCUMENTS

| | | | | |
|---|---|---|---|---|
| 1,644,560 A * | 10/1927 | Bignell | ........................ | 175/324 |
| 2,150,381 A * | 3/1939 | Lansing | ............................ | 125/21 |
| 2,795,222 A * | 6/1957 | Garrison | ......................... | 125/21 |
| 3,020,965 A * | 2/1962 | Keller, Jr. | ...................... | 175/424 |
| 3,056,267 A * | 10/1962 | McRee | ......................... | 405/191 |
| 3,578,233 A * | 5/1971 | Meister et al. | .................. | 228/5.1 |
| 4,109,480 A | 8/1978 | Sumner | | |
| 4,180,047 A * | 12/1979 | Bertelson | ........................ | 125/14 |
| 4,619,556 A * | 10/1986 | Parra | ......................... | 405/195.1 |
| 4,765,307 A * | 8/1988 | Kubo | ................................. | 125/21 |
| 4,787,363 A * | 11/1988 | Kubo | ................................. | 125/21 |
| 4,900,198 A * | 2/1990 | Hoaki | ........................... | 405/303 |
| 5,002,432 A * | 3/1991 | Dysarz | ....................... | 405/195.1 |
| 5,361,741 A | 11/1994 | Cabral | | |
| 5,361,748 A * | 11/1994 | Matteucci | ........................ | 125/21 |
| 5,524,517 A * | 6/1996 | Robinson | ..................... | 83/651.1 |
| 5,597,041 A * | 1/1997 | Robinson | ......................... | 166/55 |
| 5,623,994 A * | 4/1997 | Robinson | ....................... | 166/379 |
| 5,645,040 A * | 7/1997 | Bieri jun. | ......................... | 125/21 |
| 6,267,037 B1 * | 7/2001 | McCoy et al. | .................. | 83/745 |
| 6,672,408 B2 * | 1/2004 | Frantz | .............................. | 175/67 |
| 6,827,145 B2 * | 12/2004 | Fotland et al. | ................. | 166/298 |
| 6,881,131 B2 * | 4/2005 | Parsells et al. | .................. | 451/53 |
| 7,036,599 B2 * | 5/2006 | Matteucci | ....................... | 166/361 |
| 7,121,310 B2 * | 10/2006 | Clark et al. | ................. | 144/24.12 |
| 7,156,170 B2 * | 1/2007 | Fotland et al. | ............. | 166/77.51 |
| 7,406,905 B2 * | 8/2008 | Lawler et al. | ................. | 83/651.1 |
| 7,527,100 B2 * | 5/2009 | Abadie | ........................ | 166/298 |

FOREIGN PATENT DOCUMENTS

EP 0778392 A2 6/1997

OTHER PUBLICATIONS www.cuttingedgeservices.com.

* cited by examiner

*Primary Examiner* — Thomas Beach
*Assistant Examiner* — Matthew Buck
(74) *Attorney, Agent, or Firm* — Browning Bushman P.C.

(57) ABSTRACT

An apparatus and method for removing a subsea structure wherein a housing defining a subsea structure receiving space and having a jetting system attached at or near the bottom of the housing is used to form an excavation around the subsea structure to the desired depth and a frame attached to or mounted in the housing carries a cutter assembly which is movable from a first position on the frame to a second position on the frame, the first position being on one side of the subsea structure, the second position being on the opposite side of the subsea structure.

11 Claims, 6 Drawing Sheets

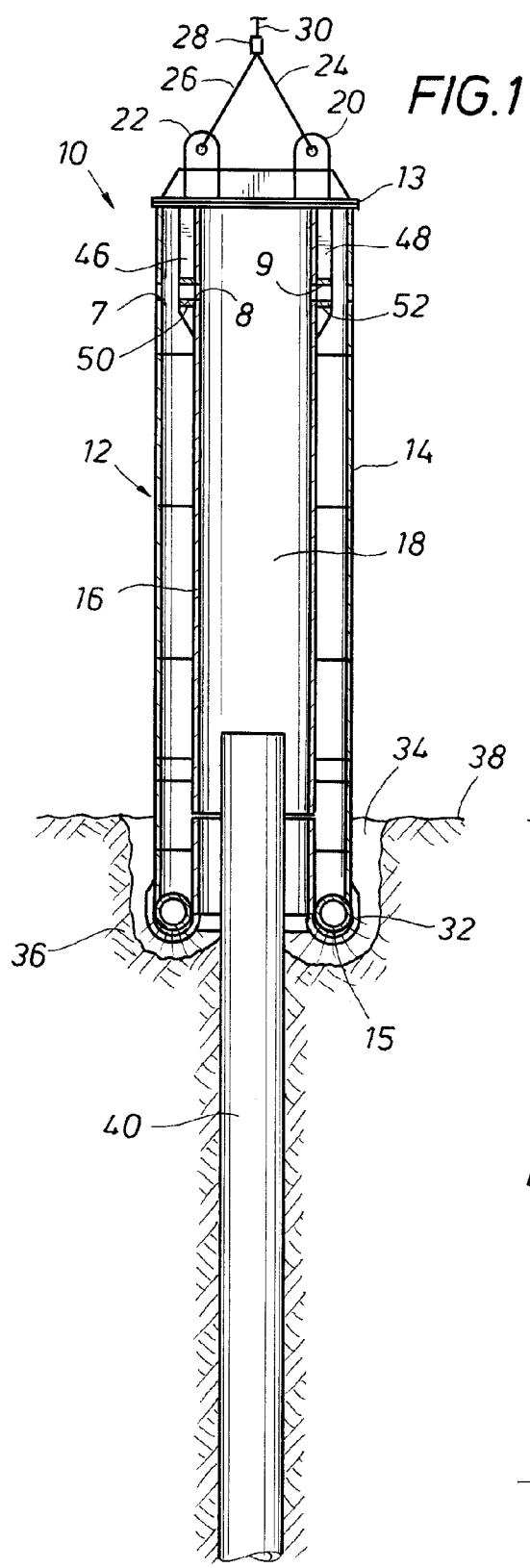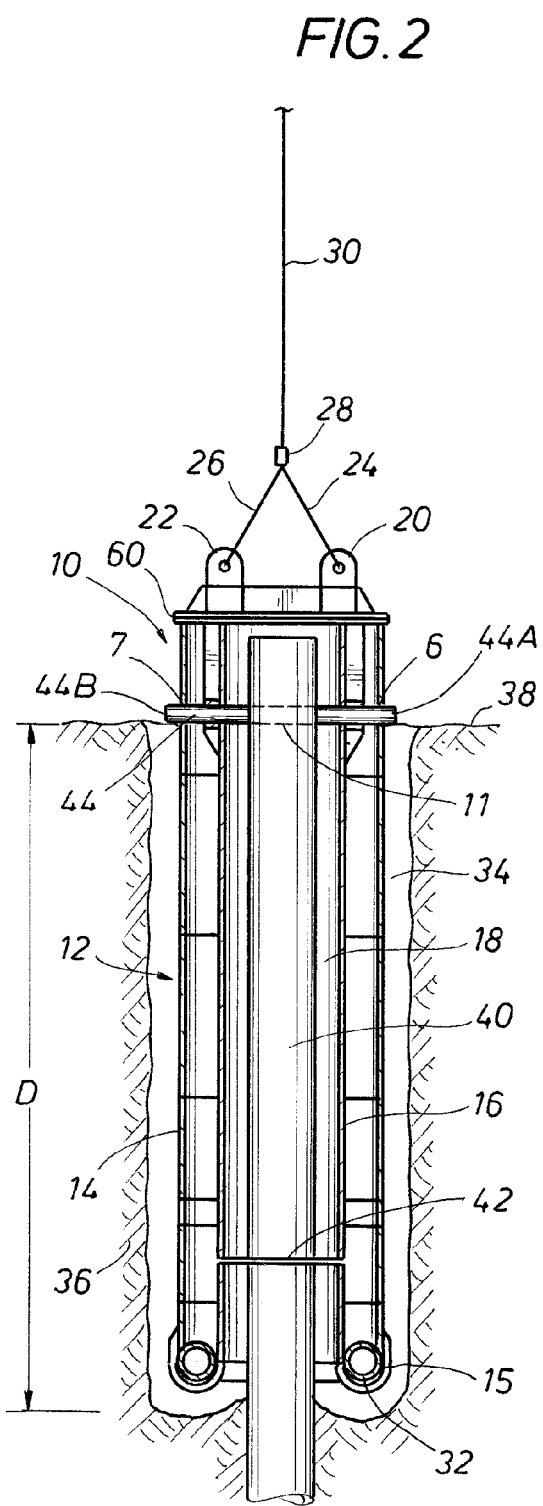

APPARATUS AND METHOD FOR REMOVING SUBSEA STRUCTURES

FIELD OF THE INVENTION

The present invention relates to the removal of subsea structures extending below the sea bed.

BACKGROUND OF THE INVENTION

There are thousands of subsea structures connected with the drilling and production of oil and gas from oil and gas wells which are now characterized as abandoned. Non-limiting examples of such subsea structures include wellheads, casing stubs, etc., which either extend above the mudline (seabed) or are close to the mudline. The subsea structures can vary from simply a relatively large diameter piece of pipe to more complex structures comprised of concentric steel pipes, the annulus between which are filled with concrete or cement.

Federal guidelines for the removal of such subsea structures in offshore water under United States jurisdiction typically mandate that the structure must be cut off 15 feet below the mudline unless a variance is obtained. Typical methods of removing subsea structures include explosive removal, thermal lances, electrodes for subsea cutting, grinders, pipe cutters, etc. However, because of the mandate that the subsea structure must be cut off 15 feet below the mudline, in many cases divers and other highly trained personnel must be employed to excavate around the subsea structure down to the desired depth and then carry out the cutting operation. Clearly such operations are tiresome, expensive and involve considerable fatigue and risk for the operating personnel.

U.S. Pat. Nos. 3,056,267 and 5,361,741 disclose methods and apparatus for cutting subsea structures.

SUMMARY OF THE INVENTION

In one aspect the present invention provides an apparatus for severing/removing a subsea structure comprising a housing having an open lower end, the housing defining a subsea structure receiving space within the housing, a jetting system attached at or adjacent the lower end of the housing for excavating subsea soil surrounding the subsea structure, a frame in the housing forming an opening through which the subsea structure can pass and a cutter mounted on the frame, the cutter being movable from a first position on the frame to a second position on the frame across the opening in the frame.

In another aspect, the present invention provides a method of severing a subsea structure having at least a portion below the mudline. In this aspect of the invention, a cutting apparatus comprising a housing having a subsea structure receiving space is positioned over the subsea structure. The method further includes excavating subsea soil surrounding the subsea structure using a jetting system attached to or adjacent the lower end of the housing until a desired depth of excavation below the mudline has been reached and at least a portion of the subsea structure is received in the subsea structure receiving space. The method further includes moving a cutter mounted in the housing through the subsea structure to sever the subsea structure.

The foregoing objects, features and advantages of the present invention, as well as others, will be more fully understood and better appreciated by reference to the following drawings, specification and claims.

BRIEF DESCRIPTION OF THE DRAWINGS

FIG. 1 is an elevational view showing the apparatus of the present invention being jetted into the subsea soil and forming an excavation around a subsea structure.

FIG. 2 is an elevational view, similar to FIG. 1, showing the apparatus of the present invention lowered to its cutting position and the subsea structure severed below the mudline.

DETAILED DESCRIPTION OF PREFERRED EMBODIMENTS

Figure 3:
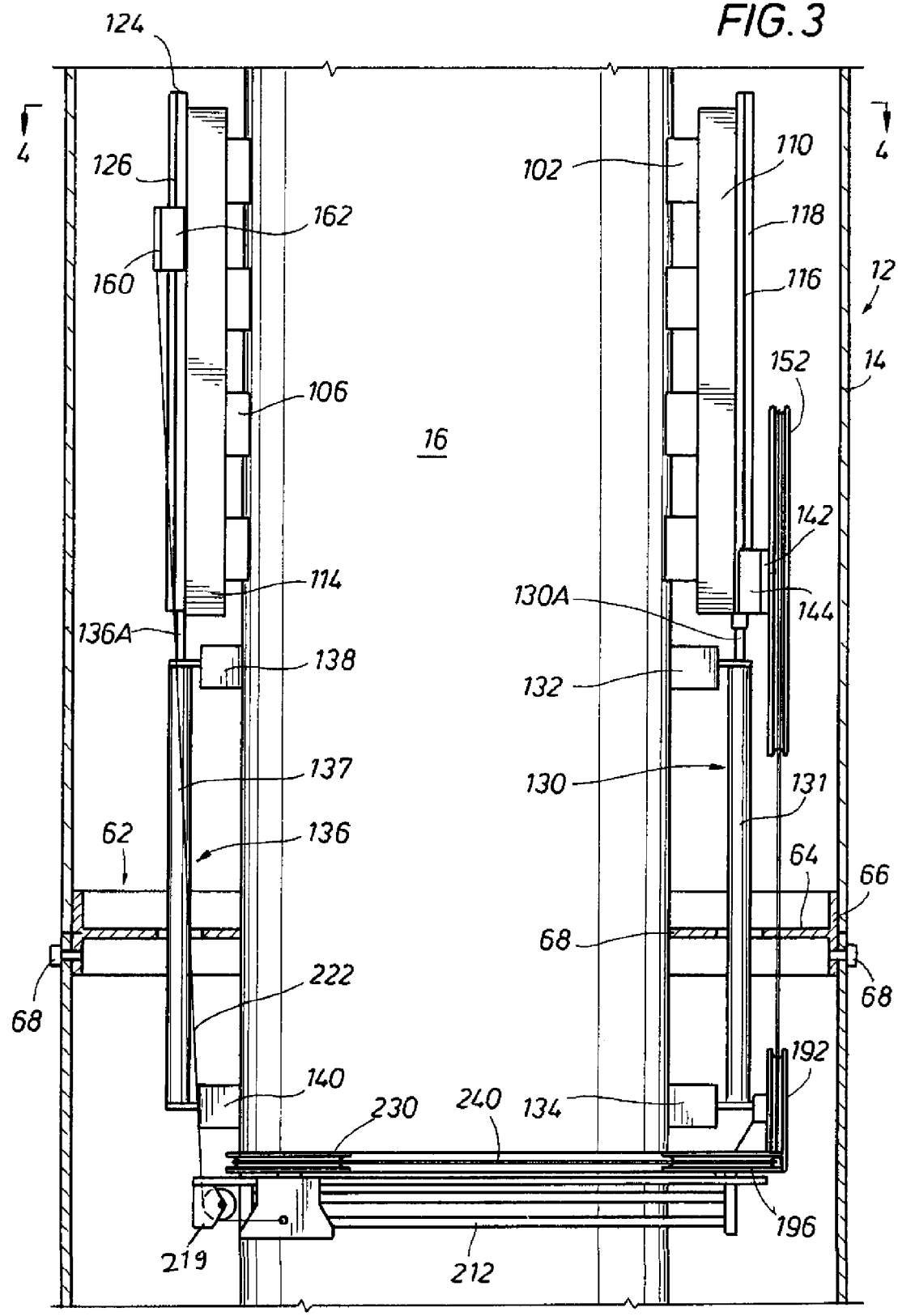
FIG. 3 is an elevational view, partly in section, showing the cutting assembly.

As used herein, the terminology "subsea structure," "underwater structure" or similar terms refers to any type of structure being oil and/or gas well related or not which has at least a portion extending below the surface of the subsea soil, i.e., the "mudline." Thus, the subsea structure can be a piling, a wellhead assembly, a casing stub or any number of structures. Generally the subsea structures which can be severed and/or removed by the apparatus and method of the present invention are of a generally tubular nature where tubular is not intended to mean a pipe but can mean a solid tubular member and whereas tubular member is not intended to mean a substantially cylindrical member in cross-section as opposed to an elongate structure having some protrusions as, for example, in a wellhead assembly. Additionally, the term subsea structure is not intended to be limited to a structure made of a single material, e.g., metal, wood, etc., but rather includes composite structures, e.g., steel and concrete structures which are commonly found in the case of oil and gas well related structures such as wellheads, casing or the like.

Referring then to FIG. 1, one embodiment of the apparatus of the present invention is shown. The apparatus of FIG. 1, shown generally as 10, comprises a housing 12 having an outer housing member 14 and an inner housing member 16, the housing 12 defining a subsea structure receiving space 18 which as shown is generally elongate in nature and extends for a substantial length of the housing 12. Attached to the upper end 13 of housing 12 are pad eyes 20 and 22 which in turn are connected to cables 24 and 26, respectively. Cables 24 and 26 are attached to a block 28 which in turn is attached to a cable 30 which extends to the surface of the sea and is suitably connected to a winch, drawworks or the like (not shown) which permits apparatus 10 to be raised and lowered from a platform, barge or the like.

As can be seen, apparatus 10 is provided at the lower end 15 of housing 12 with a jetting system 32 described more fully below but which as shown is commencing to form an excavation 34 by removing subsea soil 36 below the mudline 38 surrounding a subsea structure 40 having a portion buried below mudline 38.

Referring now to FIG. 2, the apparatus of the present invention is shown as having removed the desired amount of subsea soil 36 to form an excavation 34 having a depth D around subsea structure 40. As can be seen from FIG. 2, when excavation 34 has reached a depth D, the desired length of subsea structure 40 will be received in subsea structure receiving space 18 in housing 12 and more specifically in the subsea structure receiving space 18 formed by inner housing member 16. FIG. 2 also shows a condition where subsea structure 40 has been severed as at 42. As shown in both FIGS. 1 and 2, apparatus 10 includes registering holes 6 and 7 in outer housing member 14 which in turn are in register with holes 8 and 9 in inner housing member 16. As best seen with reference to FIG. 2, when subsea structure 40 has been severed or prior thereto, a suitable drilling mechanism would be used to drill a hole 11 in subsea structure 40 by accessing the subsea structure 40 through at least two of the adjacent registering holes in the inner and outer housing members 16 and 14. Such drilling could be accomplished by lasers, drills or the like. As can be seen with reference to FIG. 2, a pin 44 is inserted through the registering holes 6, 7, 8, 9 in the inner and outer housings 16 and 14 and the hole 11 which has been drilled through subsea structure 40, pin 44 having portions which extend outside of outer housing member 14. It will be recognized that rather than having registering holes for receipt of pin 44 in both outer housing member 14 and inner housing member 16, there could be a single hole in outer housing member 14 which was in register with diametrically opposed holes in inner housing member 16 such that when pin 44 was inserted, only one end would extend externally of outer housing 14, the other end abutting the inside wall of outer housing member 14 at a position generally diametrically opposite the hole in outer housing 14. Additionally, when portions 44A and 44B of pin 44 extend beyond the outside wall of outer housing member 14, cross pins can be inserted in bores (not shown) transverse to the long axis of pin 44 to prevent pin 44 from accidentally being dislodged during raising of the severed subsea structure.

It can be seen from the above that the apparatus of the present invention avoids the necessity for two lifting movements e.g. one movement to lift the cutting apparatus once the cutting operation has been finished and a second move to move the severed subsea structure. As described above, once the pin 44 has been positioned in the inner and outer housing 16 and 14 and through the hole 11 in the subsea structure 40, when the apparatus 10 is raised by means of cable 30 and an associated wench, draw works on the line, the severed subsea structure 40 will also be raised.

In order to more effectively sever subsea structure 40, it is desirable that the apparatus 10 be anchored relative to subsea structure 40 during the severing operation. To this end, and as shown in FIG. 2, it can be seen that when the jetting operation has ceased via jetting assembly 32, the lower end 15 of the housing 12 has effectively buried itself in the subsea soil 36 which anchors apparatus 10 and maintains it in a substantially fixed position relative to apparatus 10. It will also be appreciated that sufficient tension can be applied to cable 30 so as to restrain the upper end 13 of housing 12 from any lateral movement in excavation 34. To ensure structural integrity, flange members 46 and 48 welded on diametrically opposite sides of inner housing member 16 are provided with holes 50 and 52, respectively, which are in register with the holes in inner housing member 16. It will be appreciated that when subsea structure 40 is severed and it is being lifted to the surface, pin 44 will be urged against the lower side of the holes 50 and 52 in flanges 46 and 44, respectively.

Figure 4:
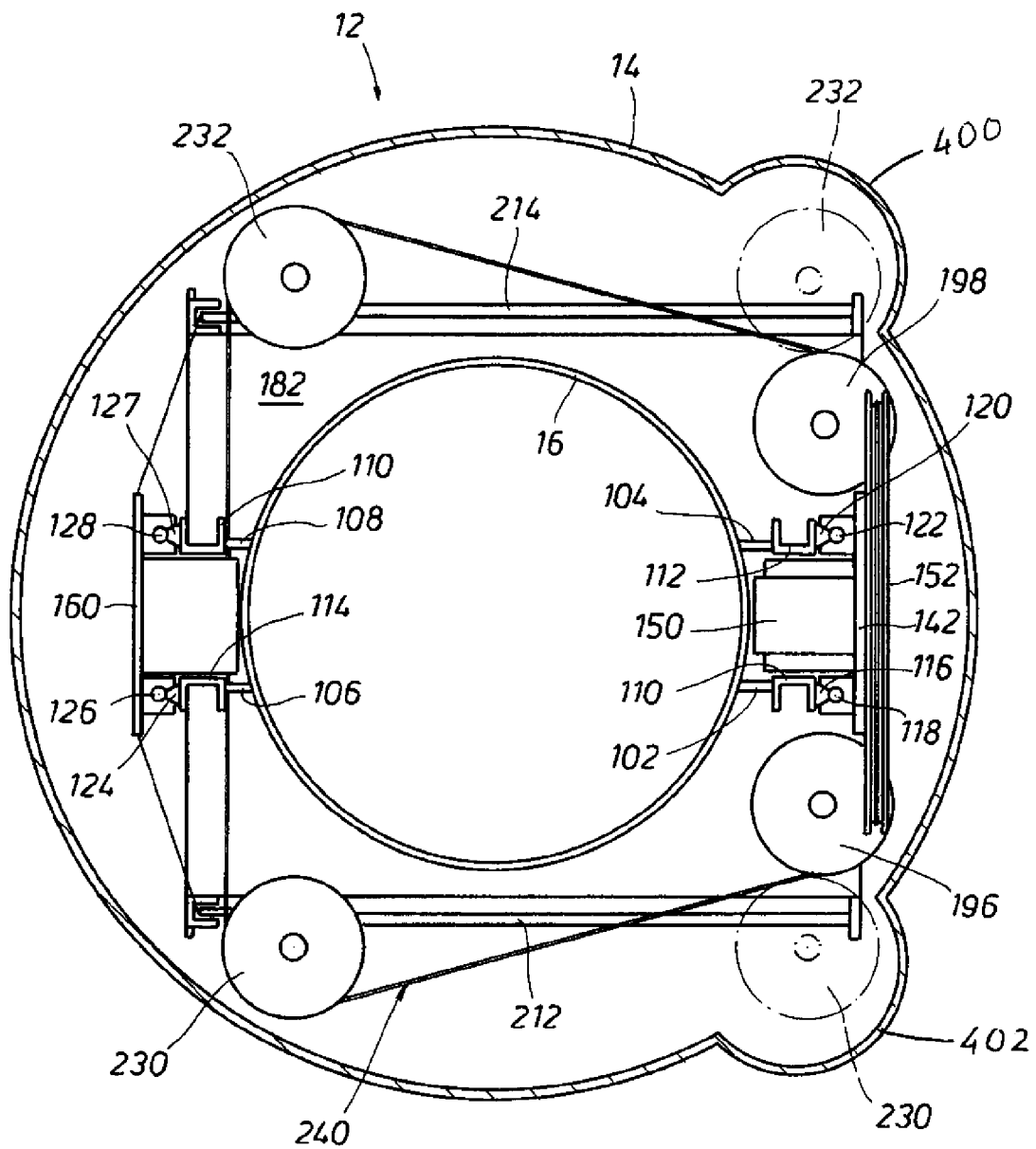
FIG. 4 is a view taken along the lines 4-4 of FIG. 3.
Figure 5:
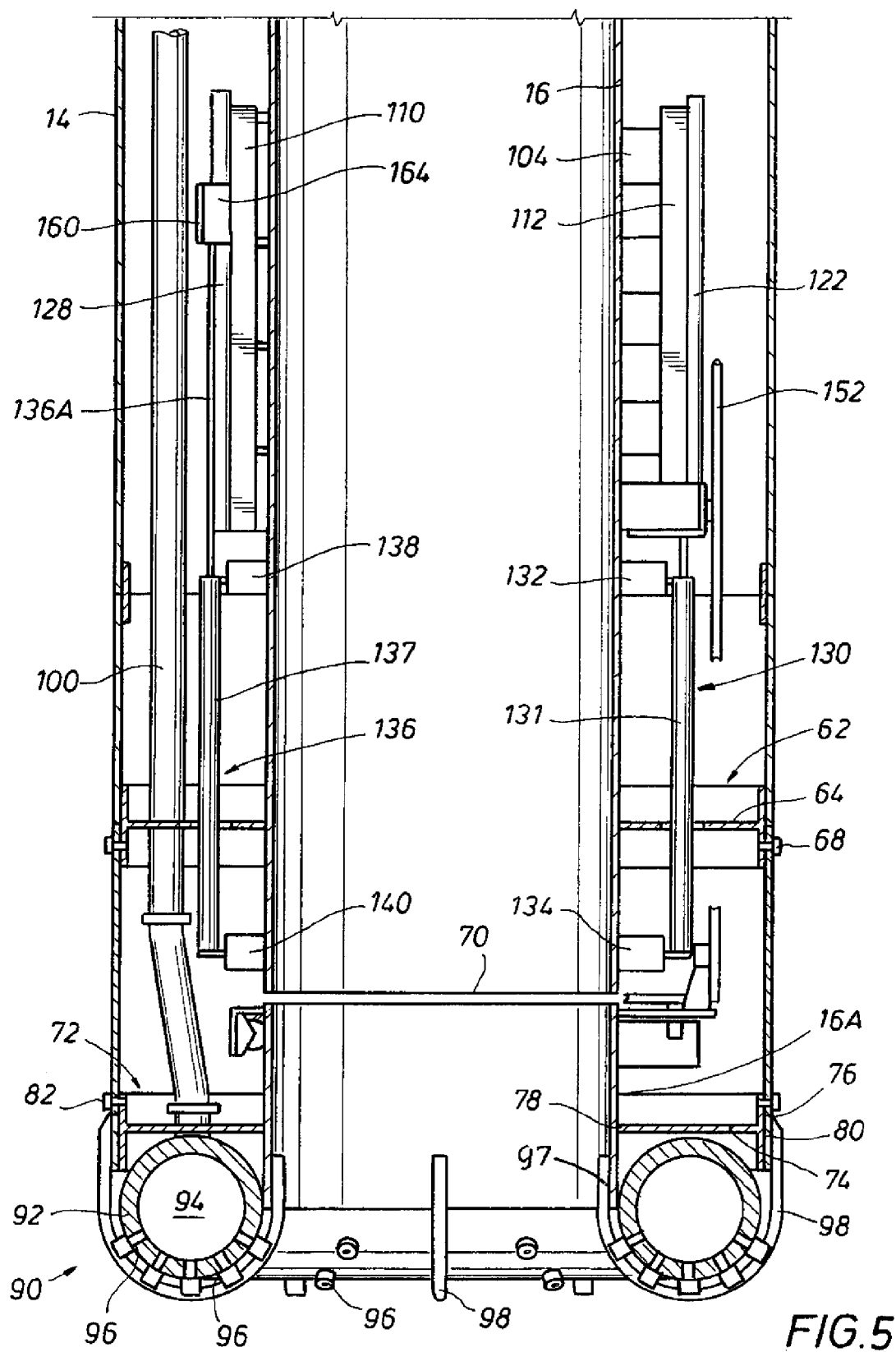
FIG. 5 is an elevational view, partly in section, showing the jetting assembly of the present invention.

Referring now to FIGS. 1-5, the interconnection between inner housing member 16 and outer housing member 14 and certain details of the cutting assembly are shown. Referring to FIG. 2, a top plate 60 is secured, e.g., by welding, to the upper ends of inner housing member 16 and outer housing member 14, thus, rigidly securing together but spacing inner and outer housing members 16 and 14. As best seen in FIG. 3, outer housing member 14 and inner housing member 16 are also secured to one another by means of an annular connector shown generally as 62 which is generally T-shaped in cross-section having an annular flange 66 secured to an annular plate 64, plate 64 having a radially innermost edge 68 which is secured to inner housing member 16. Flange 66 which is generally perpendicular to plate 64 forms an annular rim which is secured to outer housing member 14 by means of a series of bolts 68 which extend through outer housing member 14 and are threadedly received in threaded bores in rim 66. Thus, outer housing member 14 and inner housing member 16 are rigidly secured to one another substantially at upper and lower ends. As best seen in FIG. 5, inner housing member 16 has a slot 70 which extends through inner housing member 16 such that inner housing member 16 has a lower portion 16A. Lower portion 16A is secured to outer housing member 14 by a second connector 72 which is similar to connector 62 and has an annularly extending plate 74 attached to an annular extending flange 76. The radially inner edge of plate portion 74 is attached as at 78 to inner housing member 16A, e.g., by welding, while rim 80 is secured to outer housing member 14 by a series of circumferentially spaced bolts 82 in the manner described above with respect to connector 62.

Attached to the lower ends of inner housing member 16 and outer housing member 14 is a jetting assembly shown generally as 90. Jetting assembly 90 comprises a peripherally extending generally donut shaped member 92 forming an annularly extending internal chamber 94. Chamber 94 is in open communication with a plurality of jetting nozzles 96 which can be arranged at any desired pattern around the circumference of member 92 but which will be generally directed so as to achieve the desired excavation pattern around the subsea structure to be removed. Member 94 is secured to the lower ends of inner tubular member 16 and outer tubular member 14 by a series of circumferentially spaced U-shaped hangers 98 having a radially innermost leg 97 secured, e.g., by welding, to the interior wall of inner tubular member 16 and a radially outermost leg 98 secured to the outer wall of outer housing member 14. Annular chamber 94 is in open communication with a conduit 100 which is positioned in the annulus between inner and outer housing members 16 and 14 and which is connected in a manner not shown to a suitable source of pressurized fluid, e.g., water, which can be supplied from high pressure pumps or the like on a floating platform, barge or the like.

Secured to the outer surface of inner tubular member 16 and generally on one side thereof are a first set of axially spaced gussets 102 and a second set of axially spaced gussets 104, gussets 102 and 104 being circumferentially spaced from one another as shown in FIG. 4. In like manner, on the opposite side of inner housing member 16 are a third set of axially spaced gussets 106 and a fourth set of axially spaced gussets 108, gussets 106 and 108, like gussets 102 and 104 being circumferentially spaced from one another. Gussets 102 are secured, e.g., by welding to a generally axially extending channel member 110 while gussets 104 are secured to an axially extending channel member 112. In a similar fashion, gussets 106 are secured to an axially extending channel member 114 while gussets 108 are secured to an axially extending channel member 110.

As best seen in FIGS. 3 and 4, secured to channel member 110 is a rib 116, generally triangular shaped in cross-section, to which is attached a rod forming a track 118, which is generally circular in cross-section and which extends for substantially the full length of channel member 110. Similarly, a rib 120 and rod secured to channel member 112 forms a track 122, while a rib 124 and rod are attached to channel member 14 to also form a track 126. Lastly, a rib 127 and rod attached to channel member 110, form a track 128. A piston cylinder assembly shown generally as 130 is attached to inner housing member 16 by means of upper and lower brackets 132 and 134, while a second piston cylinder assembly shown generally as 136 is attached to the diametrically opposite side of the inner housing member 16 by means of upper and lower brackets 138 and 140. As can be seen, piston cylinder assembly 130 has a cylinder 131 and a piston rod 130A while piston cylinder assembly 136 has a cylinder 137 and a piston rod 136A, piston rods 130A and 136A being reciprocally movable into and out of cylinders 131 and 137, respectively.

Figure 6:
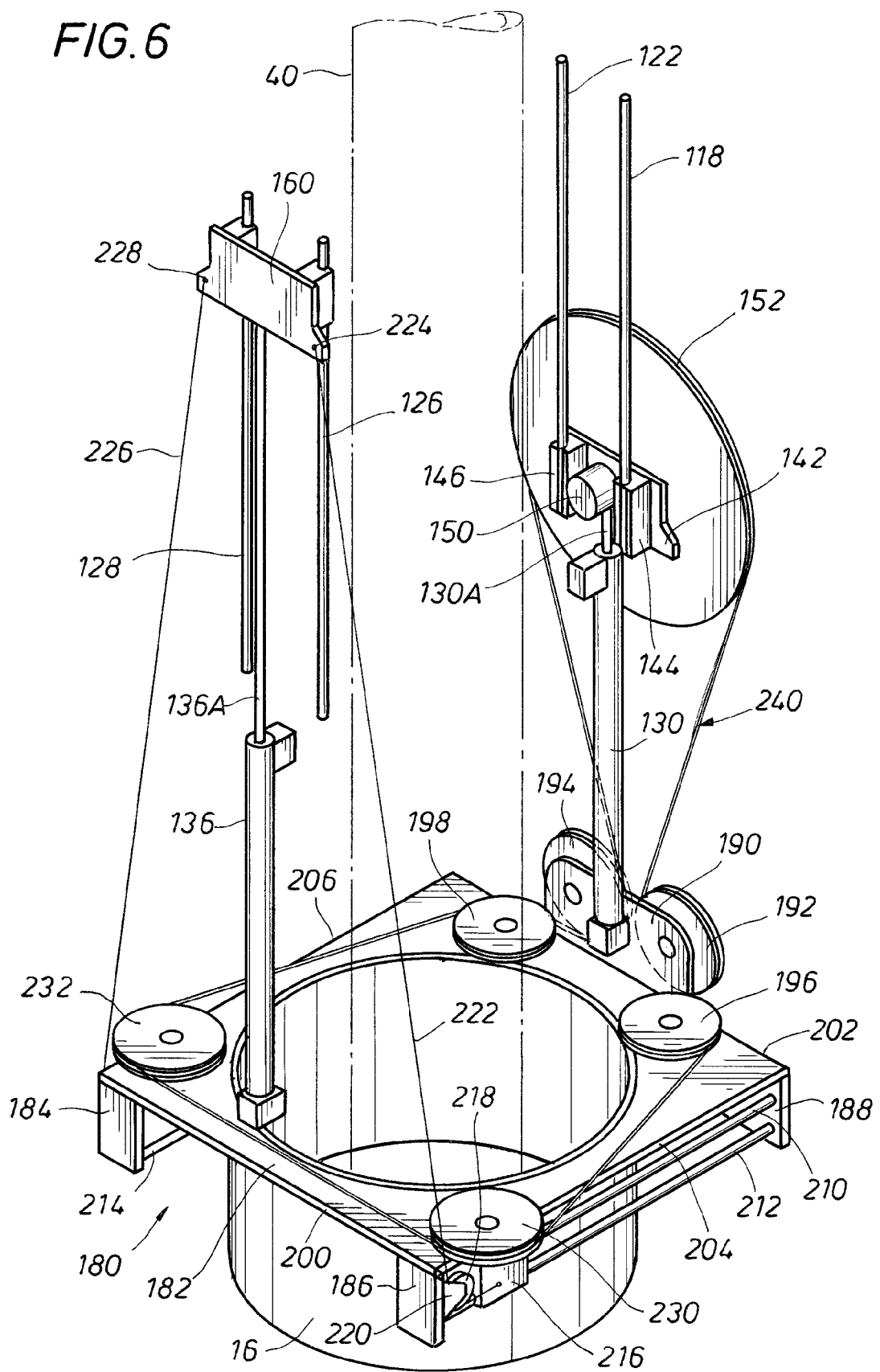
FIG. 6 is an isometric view showing the disposition of the cutting assembly of the present invention prior to engaging a subsea structure and FIG. 7 is a view similar to FIG. 6 but showing the disposition of the cutting assembly following severing of the subsea structure severed.
Figure 7:
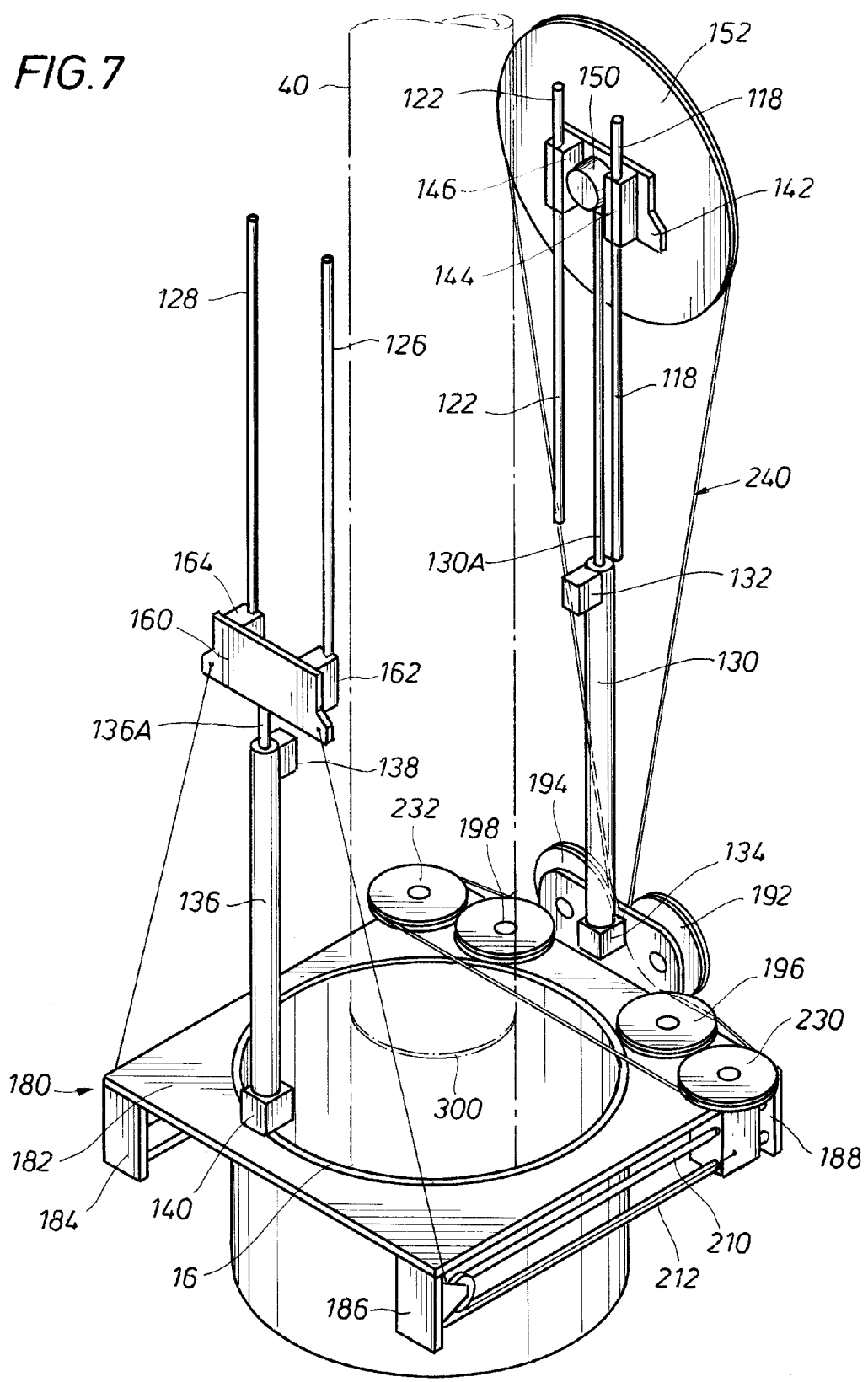

As best seen in FIGS. 6 and 7, piston rod 130A is connected to a support plate 142 on which are also attached guide blocks 144 and 146, guide blocks 144 and 146 being slidably received on tracks 118 and 122, respectively. Also attached to support plate 142, is a suitable motor 150 which can be hydraulic, electric, etc., and which serves to drive a pulley 152 rotatably mounted on support plate 142. It can thus be seen that as piston rod 130A reciprocates in and out of cylinder 131, support plate 142 together with motor 150 and drive pulley 152 will also move longitudinally along tracks 118 and 122.

Referring now to piston cylinder assembly 136, piston rod 136A is attached to a support plate 160 to which are also attached guide blocks 162 and 164, guide blocks 162 and 164 being slidable along tracks 126 and 128, respectively. Thus, as piston 136A reciprocates into and out of cylinder 137, support plate 160 together with guide blocks 164 and 162 will be moved longitudinally along tracks 126 and 128, respectively.

Referring now in particular to FIGS. 6 and 7, there is a frame shown generally as 180 which is secured, e.g., by welding, to inner tubular member 16 around its periphery. Frame 180 has a platform 182 and a series of downwardly depending flanges 184, 186, 188 and a fourth, similar flange (not shown) but being diametrically opposite flange 186. Depending upwardly from platform 182 of frame 180, is a flange 190 on which are rotatably journaled pulleys 192 and 194. Rotatably journaled on platform 182 is a pulley 196 and a spaced pulley 198. More specifically, for purposes of reference, frame 180 has a first side 200, an opposite, second side 202, a third side 204, and a fourth side 206 opposite from and spaced from third side 204. As can be seen, pulleys 196 and 198 are mounted on platform 182 of frame 180 adjacent second side 202. Running between flanges 186 and 188 are first and second guide rods 210 and 212 while a similar pair of guide rods extend between flange 184 and the fourth flange diagonally opposite flange 186, one of the guide rods extending between flange 184 and the fourth flange being indicated as 214. A pillow block 216 is slidably mounted on guide rods 210 and 212 while a similar pillow block (not shown) is mounted on the guide rods 214 and a similar guide rod (not shown) extending between flange 184 and the flange diagonally opposite flange 186.

A first tension wire or cable 220 is attached to pillow block 216 and rides on pulley 218 rotatably journaled in a bracket 219 attached to flange 186. Cable 220 is attached to support plate 160 as shown at 224. A second tension wire 226 extends from support plate 160 as at 228 over a pulley (not shown) and is attached to the second pillow block (not shown) which slidably moves along guide rod 214 and a second guide rod (not shown). As noted above, there is a second pulley assembly mounted to flange 184 in the same manner that pulley 218 is mounted to flange 186. As shown, pulleys 196, 198, 230 and 232 are substantially coplanar.

Referring again to FIG. 6, it can be seen that subsea structure 40 extends through an opening in frame 180 generally defined by the periphery of inner housing member 16. An endless cutting wire shown generally as 240 is threaded over a path which includes powered drive pulley 152 to pulley 192, then to pulley 196, then to pulley 230, then to pulley 232, then to pulley 198, then to pulley 194, and then again to powered drive pulley 152. It will thus be appreciated that when powered drive pulley 152 is rotating, the endless cutting wire 240 will travel through the above described cutting pattern over the various pulleys in the direction determined by the rotational direction of powered drive pulley 152. It should be noted that while the cutting wire 240 is shown as moving in a cutting pattern which is unidirectional, provision could be made to oscillate the cutting wire 240 in a back and forth, sawing direction, i.e., between pulleys 230 and 232.

In the environment shown in FIG. 6 and as depicted in FIG. 2, subsea structure 40 has been received within subsea structure receiving space 18 in housing 12. Upon activation of motor 150 which drives powered drive pulley 152, powered drive pulley 152 will commence rotating which, as noted above, will then move endless cutting wire 240 through the pattern described above, i.e., in a unidirectional cutting pattern. If piston cylinder combination 130 is now actuated to extend piston rod 130A out of cylinder 131, powered drive pulley 152 will now move upwardly relative to frame 180 which cause pulleys 230 and 232, journaled in the pillow blocks, to move in a direction from frame side 200 toward frame side 202, i.e., the pillow blocks upon which pulleys 230 and 232 are mounted will ride along the guide rods 210 and 212 entirely between flanges 186 and 184, towards flanges 188 and the other flange (not shown) diagonally opposite flange 186, respectively. Continued movement of powered drive pulley 152 in an upward direction relative to frame 180 via piston cylinder combination 130 will force endless cutting wire 240 against subsea structure 40 which will commence a severing of subsea structure 40. At the same time that piston rod 138 is being extended from cylinder 131, piston rod 136A is being retracted into cylinder 137. This is best shown in FIG. 7 where, as compared with FIG. 6 it can be seen that support plate 160 has moved downwardly relative to frame 180 from the position shown in FIG. 6 to the position shown in FIG. 7. As shown in FIG. 7, endless cutting wire 240 has now been moved to a position where it has moved completely through subsea structure 40 as shown by the complete radial cut 300 which has been made through subsea structure 40.

In addition to maintaining tension, if needed, on pulleys 230 and 232 as they move from side 200 to side 202 of frame 180, piston cylinder combination 136 also serves the purpose of retracting pulleys 230 and 232 and their associated pillow blocks back to the original position shown in FIG. 6 once the severing operation has been completed. To this end, once severing of subsea structure 40 has been completed, motor 150 would be disengaged ceasing rotation of powered drive pulley 152. Thus, as piston rod 136A was extended out of cylinder 136, piston rod 130A would be retracted into cylinder 130 such that the assembly resumed the position shown in FIG. 6. Piston cylinder combination 136 also acts as a hold back to prevent too much tension from being applied to cutting wire 240 during the severing operation.

Once severing of subsea structure 40 has been completed, then via the attachment described above using pin 44, the severed portion of subsea structure 40 can then be lifted out of excavation 34 to the surface of a barge, platform or the like for proper disposal.

While as shown, housing 12 is comprised of a generally cylindrical outer housing member 14 and a generally inner cylindrical housing member 16, as seen in FIG. 4, to accommodate the pulley system mounted on frame 180, outer housing body 114 can be provided with protrusions 400 and 402. Further, while the housing 12 has been shown with respect to inner and outer generally cylindrical members, it is to be understood that the word "housing" as used herein is intended to include any framework, or other structure upon which the cutting assembly described above and the jetting assembly 132 can be mounted, attached or carried. Generally speaking by making the housing 12, particularly the outer housing member 14 of generally tubular construction, it is easier to prevent jetted subsea soil from filling subsea structure receiving space 18 in the housing 12. In this regard, the upper end 13 of housing 12 is open to permit jetted subsea soil 36 to escape from excavation 34. Further, the excavated subsea soil 36 will tend to move in a direction upwardly outside of the outer housing member 14.

While in the description above the cutter has been described with respect to an endless cutting wire, it will be obvious that other suitable tools such as laser cutters or other more sophisticated cutting systems could be substituted and mounted within the housing 12 to perform severing of the subsea structure 40.

When an endless cutting wire is employed, it is desirable to use a diamond cutting wire. Such diamond cutting wire is readily available commercially from a wide variety of sources.

Although the cutting wire is shown as moving in a cutting pattern which is unidirectional, e.g., it follows the direction dictated by the direction of rotation of powered drive pulley 52, the cutting system could be designed such that the cutting wire rather than moving in a single direction was oscillated or reciprocated back and forth in a sawing action with provision being made, similar to that described above, to force the cutting wire against the subsea structure. However, while certainly feasible, this cutting pattern is somewhat less desirable as excessive wear is placed on one section of the cutting wire. However, even in this event, provision could be made to stop the sawing motion, move the cutting wire to a new section and then resume the sawing action.

It will be apparent that operation of the powered drive pulley and the piston cylinder combinations can be done via umbilical cords or the like, connected to suitable hydraulic sources and extending from a surface platform, barge, or the like, from an ROV, or from divers positioned near the subsea structure. Indeed, it is a feature of the present invention that divers can be used with relative safety, particularly in relatively shallow waters to position the cutting apparatus of the present invention as well as control the operation of the powered drive pulleys as well as the piston cylinder combinations.

While as shown the frame 180 is positioned in the housing so as to form a generally horizontal cut through the subsea structure, it will be understood that the frame could be canted so as to make a diagonal cut through the subsea structure if desired. Indeed, it is only necessary that the frame on which the cutting system is at least partially mounted provide an opening through which the subsea structure can pass and a cutting element can be moved across the opening whereby a subsea structure passing through the opening is severed by the cutter or cutting element.

The foregoing description and examples illustrate selected embodiments of the present invention. In light thereof, variations and modifications will be suggested to one skilled in the art, all of which are in the spirit and purview of this invention.

What is claimed is:

1. Apparatus for removing a subsea structure comprising:
a housing, said housing having an upper end and a lower end, the lower end of said housing being open, said housing defining a subsea structure receiving space within said housing;
a jetting system attached adjacent the lower end of said housing, said jetting system being adapted to excavate subsea soil surrounding said subsea structure;
a frame attached to said housing, said frame forming an opening through which said subsea structure can pass, said frame comprising a first side, a second side, a third side and a fourth side, a first track assembly extending along said third side of said frame and a second track assembly extending along said fourth side of said frame, a first pillow block slidably mounted on said first track assembly and a second pillow block slidably mounted on said second track assembly, said first and second pillow blocks being reciprocally movable along said first and second track assemblies, respectively, there being a first pulley rotatably mounted in said first pillow block and a second pulley rotatably mounted in said second pillow block and there are third and fourth pulleys rotatably mounted on said frame adjacent said second side;
a powered drive pulley operatively mounted on said housing, said powered drive pulley being driven by a motor;
a first guide assembly attached to said housing, said first guide assembly including a first guide and a first guide frame slidably mounted on said first guide, said powered pulley and said motor being mounted on said first guide frame for longitudinal movement along said first guide in a direction generally transverse to a plane passing through housing;
a cutter mounted on said frame, said cutter being movable from a first position on said frame to a second position on said frame across said opening.

2. The apparatus of claim 1, wherein said housing comprises an outer housing member and an inner housing member, said inner housing member defining said subsea structure receiving space.

3. The apparatus of claim 2, wherein said inner housing member is slotted and said cutter is mounted on said frame and is adapted to move through said slot in said inner housing member.

4. The apparatus of claim 1, wherein said first, second, third and fourth pulleys are substantially coplanar.

5. The apparatus of claim 1, wherein there are fifth and sixth pulleys mounted on said frame adjacent said second side, said fifth and sixth pulleys and said driver pulley being in planes generally transverse to a plane passing through said housing.

6. The apparatus of claim 5, wherein said cutter comprises an endless cutting wire extending in sequence over said powered pulley, said sixth pulley, said fourth pulley, said second pulley, said first pulley, said third pulley, said fifth pulley and back to said powered pulley.

7. The apparatus of claim 1, wherein there is first reciprocating mover interconnecting said frame adjacent said second side and said first guide frame, said first reciprocating mover assembly being operable to reciprocate said first guide frame along said first guide.

8. The apparatus of claim 7, wherein there is a second guide assembly disposed generally opposite said first guide assembly, said second guide assembly including a second guide and a second guide frame slidably mounted on said second guide for longitudinal movement along said second guide in a direction generally transverse to a plane passing through said housing.

9. The apparatus of claim 8, wherein there is a second reciprocating mover interconnecting said frame adjacent said first side, said second reciprocating mover being operable to reciprocate said second guide frame along said second guide.

10. The apparatus of claim 9, wherein there is a first tension connector interconnecting said first pillow block and said second guide frame and a second tension connector interconnecting said second pillow block and said second guide frame.

11. The apparatus of claim 1, further comprising a selectively engageable attachment member between said housing and said subsea structure.

* * * * *